Figure 1:
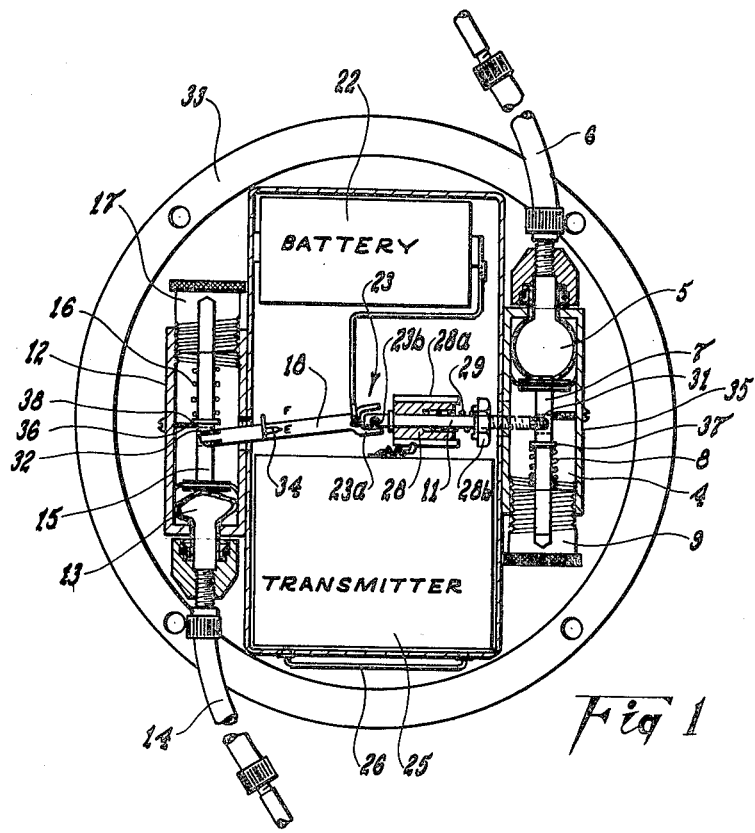

Dec. 14, 1965   A. L. COURSE   3,223,969
TIRE PRESSURE INDICATING APPARATUS FOR ROAD VEHICLES
Filed July 22, 1963

INVENTOR
ALEXANDER L. COURSE
BY

United States Patent Office 3,223,969
Patented Dec. 14, 1965

3,223,969
TIRE PRESSURE INDICATING APPARATUS FOR ROAD VEHICLES
Alexander Lawrence Course, 10 Fitzroy St., East Geelong, Victoria, Australia
Filed July 22, 1963, Ser. No. 296,756
Claims priority, application Australia, July 31, 1962, 20,529/62
2 Claims. (Cl. 340—58)

The present invention relates to tire pressure indicating apparatus for use on road vehicles when they are in motion.

When a vehicle is in motion it is possible that a tire will lose its air pressure and become deflated. In such an event there is the likelihood that an accident will occur. This possibility is even more likely with heavy transport vehicles where two tires are used on each wheel to provide the necessary pneumatic support for the vehicle and its load.

It has hitherto been proposed to provide apparatus of the kind indicated which includes means located on each wheel of the vehicle for detecting a loss in the pressure of the air in a tire on the wheel, means located on the dashboard or other convenient position on the vehicle for giving an indication that there has been a loss in air pressure in the tire, and means for operatively connecting the detecting means and the indicating means. The connecting means has usually included an electrical circuit incorporating a commutating device to provide an effective electrical connection between the detecting means on the rotating wheel and the indicating means on the dashboard.

This known apparatus suffers primarily from the objection that the commutating device often becomes defective during use thus the indicating means does not positively give the desired indication when there is a loss in the air pressure in the tire. The present invention has for its primary object to provide apparatus of the kind indicated which will overcome this objection. The invention has for a further object to provide improved means in apparatus of the foregoing kind for detecting a loss in the air pressure of the tire.

According to the invention apparatus for indicating a loss in effective air pressure of a vehicle tire, comprises detecting means for attachment to each wheel of the vehicle to detect a loss in the pressure of the air in the tire on the respective wheel; indicating means for attachment to the vehicle near the driver's position for giving a warning indication when a loss in the pressure of the air in a tire is detected by the detecting means; and means for operatively connecting each detecting means to the indicating means and comprising an electrical circuit for each wheel of the vehicle to be mounted in association with the respective detecting means and incorporating a source of current, normally open circuit closing means to be closed by the respective detecting means when a loss in the pressure of the air in a tire is detected by the respective detecting means, and a transmitter to be rendered operative when the circuit closing means is closed by the detecting means to generate and transmit a radio frequency signal, and a receiver juxtaposed to the indicating means for receiving the radio frequency signals from the transmitters and electrically connected to the indicating means to operate the indicating means to give a warning indication when a loss of the pressure of the air in a tire is detected by any of the detecting means.

Figure 2:
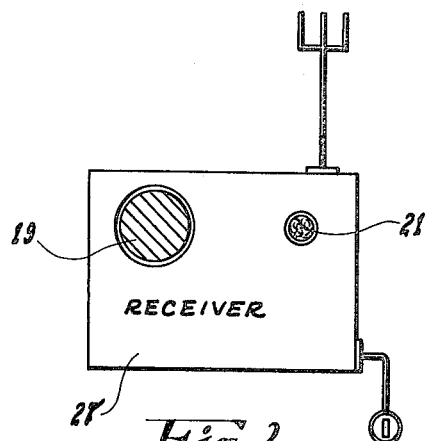

In order that the invention may be readily understood reference is made to the accompanying drawings in which;

FIGURE 1 is a part sectional elevation of the apparatus of the invention to be attached to each wheel of a vehicle; and FIGURE 2 is a diagrammatic view of the apparatus to be attached to the dashboard or other convenient situation on the vehicle near the driver's position.

Referring to the drawings FIGURE 1 shows apparatus according to the invention to be attached to a vehicle wheel incorporating dual tires.

The apparatus shown in FIGURE 1 includes detecting means for attachment to a wheel of the vehicle to detect a loss in the pressure of the air in the tire on the wheel. The detecting means may comprise a compartment 4, a substantially spherical bladder 5 enclosed in the compartment 4 near one end thereof and a flexible tube 6 communicating with the bladder 5 and extending through an end wall of the compartment 4 for connection to an inflating valve on a tire. The detecting means may also include a capped stem 7 extending between the opposite end of the compartment 4 and the bladder 5. A spring 8 urges the capped end of the stem 7 against the bladder at a pressure somewhat less than the pressure of the air in the tire when the tire is fully inflated. A screw cap 9 may be provided to adjust the strength of the spring 8. The detecting means may also include a lever 11, pivotally connected at one end thereof to the stem 7 and having its other end connected to normally open circuit closing means to be hereinafter described. The detecting means just described is adapted to indicate any loss in the pressure of the air in one tire of the dual tired wheel. Similar detecting means including a compartment 12, a substantially spherical bladder 13, a flexible tube 14, a capped stem 15, a spring 16, a screw cap 17 and a lever 18 may be provided for the other tire.

The apparatus also includes indicating means near the driver's position for giving a warning indication when a loss in the pressure of the air in a tire is detected by the detecting means. The indicating means illustrated in FIGURE 2 consists of an audible warning device 19 and a visual warning device 21. The devices 19 and 21 may be attached to the dashboard of the vehicle.

Means are also provided for operatively connecting the detecting means to the indicating means. The means to be described is common to both the above described detecting means and comprises an electrical circuit for each wheel of the vehicle to be mounted in association with the respective detecting means. The electrical circuit incorporates a source of current such as the battery 22, normally open circuit closing means 23 having contact elements 23a and 23b to be closed by the lever 11 or the lever 18 in the respective detecting means when a loss in the pressure of the air in a tire is detected by the bladder 5 or the bladder 13, and a transmitter 25 to be rendered operative when the contact elements 23a and 23b of the circuit closing means 23 are closed by the lever 11 or the lever 18 to generate and transmit a radio frequency signal. The transmitter 25 may include a transistor operated oscillator consisting of a conventional Hartley or Colpitts oscillatory circuit and its output may be applied to a frame aerial 26. A receiver 27 is juxtaposed to the indicating means comprising the audible warning device 19 and the visual warning device 21 for receiving the raido frequency signals from the transmitter 25. The receiver is electrically connected to the indicating means to operate the indicating means to give a warning indication when a loss of the pressure of the air in a tire is detected by any of the detecting means.

The apparatus may also include a spring influenced centrifugal switch 28 slidably mounted on the lever 11 and having its contact members 28a and 28b included in the electrical circuit from the battery 22 to the transmitter 25. The centrifugal switch 28 is adapted to be influenced by the centrifugal force developed by the rotating wheel of the vehicle into one position to bring the electrical circuit into a quiescent condition ready to be closed by the contact elements 23a and 23b on the circuit closing means 23 when the vehicle is in motion and to be influenced by its associated spring 29 into a second position to maintain the electrical circuit open even if the contact elements 23a and 23b on the circuit closing means 23 are closed whilst the vehicle is stationary. The outer ends of the levers 11 and 18 are provided with insulating caps 31 and 32 so that the transmitter 25 will not be bridged when the contact elements 23a and 23b on the circuit closing means 23 are closed.

A mounting bracket 33 may be provided to support the apparatus and attach it to a vehicle wheel.

In operation when a tire becomes deflated while the vehicle is in motion so that the air pressure therein is less than the pressure exerted by the spring influenced capped stem 7 the bladder 5 will be compressed by the capped stem 7. The stem 7 will then move towards the bladder end of the compartment 4 and the lever 11 will then pivot on the stem 7 and close the contact elements 23a and 23b on the circuit closing means 23. As the centrifugal switch is actuated by the centrifugal force developed by the rotating wheel its contact members 28a and 28b are closed consequently the electrical circuit from the battery 22 to the transmitter 25 will be closed so that the transmitter will transmit a radio frequency signal. This signal will be picked up by the receiver 27 which will function to operate the warning device 19 and the warning device 21. The driver of the vehicle will therefore receive a timely warning that a tire has become deflated. The detecting means including the bladder 13 and lever 18 illustrates the operation of the apparatus when there is a loss in the pressure of the air in a tire.

A visual indicator 34 may be provided when dual tires are used to indicate the tire in which there is a loss of the pressure of the air therein. In addition limit studs 35 and 36 which are attached to the walls of the compartments 4 and 12 and which are adapted to engage circumferential beads 37 and 38 on the capped stems 7 and 15 may be provided to prevent the bladders 5 and 13 becoming damaged when they are compressed by the capped stems.

Having now described my invention, what I claim as new and desire to secure by Letters Patent is:

1. Apparatus for indicating a loss in effective air pressure of a vehicle tire, comprising detecting means for attachment to each wheel of the vehicle to detect a loss in the pressure of the air in the tire on the respective wheel; indicating means for attachment to the vehicle near the driver's position for giving a warning indication when a loss in the pressure of the air in a tire is detected by said detecting means; and means for operatively connecting said detecting means to said indicating means and comprising an electrical circuit for each wheel of the vehicle to be mounted in association with the respective detecting means and incorporating a source of current, normally open circuit closing means to be closed by the respective detecting means when a loss in the pressure of the air in a tire is detected by the respective detecting means, and a transmitter to be rendered operative when the circuit closing means is closed by the detecting means to generate and transmit a radio frequency signal, and a receiver juxtaposed to said indicating means for receiving the radio frequency signals from said transmitters and electrically connected to said indicating means to operate said indicating means to give a warning indication when a loss of the pressure of the air in a tire is detected by any of said detecting means, each detecting means comprising a compartment, a substantially spherical bladder enclosed in said compartment near one end thereof and having a flexible tube communicating therewith and extending through an end wall of said compartment for connection to an inflating valve on a tire, a capped stem extending between the opposite end of said compartment and said spherical bladder, a spring urging the capped end of said stem against the bladder at a pressure somewhat less than the pressure of the air in the tire when the tire is fully inflated, and a lever pivotally connected at one end thereof to said stem and having its other end connected to said circuit closing means to close said circuit closing means when said spherical bladder is compressed by reason of loss of the pressure of the air in a tire and the pressure developed by said spring.

2. Apparatus according to claim 1, in combination with a spring influenced centrifugal switch slidably mounted on said lever and having its contact members included in said electrical circuit, said centrifugal switch being adapted to be influenced by the centrifugal force developed by the rotating wheel of the vehicle into one position to bring said electrical circuit into a quiescent condition ready to be closed by said circuit closing means when the vehicle is in motion, and to be influenced by its associated spring into a second position to maintain said electrical circuit open even if said circuit closing means is closed whilst the vehicle is stationary.

References Cited by the Examiner
UNITED STATES PATENTS 2,860,321  11/1958  Strickland et al. _____ 340—58
2,966,658  12/1960  O'Neill _____ 340—58

NEIL C. READ, *Primary Examiner.*

A. H. WARING, *Assistant Examiner.*